Patented Oct. 20, 1936

2,058,075

UNITED STATES PATENT OFFICE 2,058,075

PROCESS FOR MAKING ARTIFICIAL CRYOLITE

Gant Gaither, Hopkinsville, Ky.

No Drawing. Application June 9, 1934,
Serial No. 729,899

1 Claim. (Cl. 23—88)

This invention relates to the manufacture of metallic compounds containing fluorine, particularly aluminum and sodium fluorides and the complex sodium-aluminum fluoride compound or artificial cryolite, so called, usually considered approximately $3NaFAlF_3$.

Heretofore artificial cryolite has contained many objectionable impurities or the process has caused a waste of material or is manufactured by a dry process with the necessity of a preferable temperature of 700° F. to 950° F. This latter is costly and requires expensive and cumbersome tumbling barrel equipment therefor. Also many separate operations both chemical and mechanical are necessary in previously patented methods.

The present invention has for its object a simple, a very accurate, flexible and efficient process, in which many of the above objections are avoided. In general terms the invention consists of bringing together sodium aluminate derived from any desired aluminiferous material, such as bauxite, diaspore, gibbsite, kaolinite, pyrophyllite, alunite, aluminite, and alunogen, further alkalinized with the correct molecular excess of sodium hydroxide, and the correct molecular amount of hydrofluoric acid, so that it will form the definite double salt known as artificial cryolite; the bringing together of sodium aluminate further alkalinized with a different and predetermined correct molecular amount of sodium hydroxide and the correct molecular amount of hydrofluoric acid so that there will be formed both the definite double salt known as artificial cryolite, and at the same time and in addition, aluminum fluoride, in definite predeterminable ratio each to the other, depending on using the sodium aluminate without excess sodium hydroxide or with gradually increasing amounts of sodium hydroxide until the correct molecular excess is attained at which point aluminum fluoride is no longer formed but cryolite only.

The simultaneous production of cryolite and aluminum fluoride with the ratio variable will be very useful in the aluminum industry where the bath of molten salts is used, (this bath contains both cryolite and aluminum fluoride). By this invention both these salts can be manufactured at one step in a suitable ratio by varying the excess sodium hydroxide.

The process may be executed in several ways. The materials, sodium aluminate and sodium hydroxide may be proportioned dry and treated with the correct amount of hydrofluoric acid, either in gaseous form or aqueous solution; the materials, sodium aluminate and sodium hydroxide may be proportioned in aqueous solution and treated with the correct amount of hydrofluoric acid either in gaseous form or aqueous solution. I prefer this latter.

My process is based on the fact that the sodium aluminate, sodium hydroxide and hydrofluoric acid combine accurately to form the double salt cryolite when properly proportioned and in addition, if desired, aluminum fluoride as well as sodium fluoride in predetermined amounts when varying predetermined amounts of sodium hydroxide are used. The central reaction to form only cryolite may be expressed by the following chemical equation:

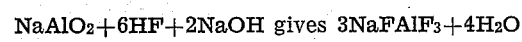

$NaAlO_2 + 6HF + 2NaOH$ gives $3NaFAlF_3 + 4H_2O$

The above referred to "correct proportions" and "correct amounts" of the materials involved in making cryolite are determined from this chemical equation. For example, in a proper container, we add to 82 parts, by weight, of sodium aluminate, 80 parts, by weight, of sodium hydroxide, then 120 parts, by weight, of hydrofluoric acid. The reactions take place rapidly, then the precipitated cryolite is allowed to settle from the supernatant water, the water decanted, or filtered or otherwise removed, the residue (cryolite) dried. In the above case, there will be formed 210 parts, by weight, of cryolite, and 72 parts, by weight, of water, (which as just stated we remove). The combining weights above shown are the molecular weights of the materials in question.

Inasmuch as sodium aluminate under ordinary processes, such for example, the Bayer process, is made by treating an aluminiferous material with sodium hydroxide under proper conditions, this fact is used as the starting point of the invention it being, of course, a logical fact that no more sodium hydroxide is ordinarily employed in making the sodium aluminate than is necessary to combine with the aluminum in the bauxite or other source substance, so that the sodium aluminate has, at the most, only a slight alkaline bias. The process of the invention involves two principal steps, as follows:

First step: That of forming sodium aluminate with the correct molecular excess of sodium hydroxide acting preferably on bauxite, thus forming sodium aluminate already including the correct molecular excess of sodium hydroxide to make perfect the second step.

Second step: Treating the properly alkalinized sodium aluminate with the correct amount of hydrofluoric acid, either in aqueous solution or gas so the resulting product will be artificial cryolite.

The chemical equation expressing these two steps combined may be expressed thus:

$$Al_2O_3 + 6NaOH + 12HF \text{ gives } 2(3NaFAlF_3) + 9H_2O$$

When the reaction is completed, the precipitated cryolite is allowed to settle and the liquid which is water may be decanted, or the cryolite filtered from the water, whichever is the most desirable.

The cryolite is then dried in a conventional manner at temperatures from 100° C. to 200° C. as may be required.

Cryolite is then ready for use in the arts without waste of material, or use of excess heat, by a very accurate and simple process that may be carried out in conventional types of equipment.

If more sodium hydroxide is added than the correct excess necessary to form the accurate molecule of cryolite, then this over-plus of sodium hydroxide will yield sodium fluoride in addition to the cryolite, which is valued in the ceramic industry.

If it is desired to manufacture a mixture of cryolite and aluminum fluoride for the electrolytic bath in the production of aluminum or any other purpose, then the amount of excess sodium hydroxide is decreased until there are not sufficient sodium molecules available to combine with all the aluminum molecules. These aluminum molecules then combine with fluorine to form aluminum fluoride which is admixed with the cryolite. As the hydroxide is decreased within the limits correspondingly larger amounts of aluminum fluoride will be obtained until the limit is reached.

The chemical equations of these reactions follow:

$$3NaAlO_2 + 12HF \text{ gives } 3NaFAlF_3 + 2AlF_3 + 6H_2O$$

Starting with sodium aluminate.

$$3Al_2O_3 + 6NaOH + 24HF \text{ gives}$$
$$2(3NaFAlF_3) + 4AlF_3 + 15H_2O$$

Starting with non-alkaline aluminous material.

The proportion of aluminum fluoride is easily increased or decreased by the exact desired predetermined amounts within the limits of molecular combination by correctly varying the amount of sodium hydroxide present.

For example, if I wish to make a mixture of cryolite and aluminum fluoride containing the maximum amount of aluminum fluoride that can be made according to my process, I then mix, in a proper container or reaction vessel, 246 parts, by weight, of sodium aluminate with 240 parts, by weight, of hydrofluoric acid; there is formed by this combination 210 parts, by weight, of cryolite and 168 parts, by weight, of aluminum fluoride (plus 108 parts, by weight, of water, which is subsequently removed). From this, the resultant cryolite-aluminum fluoride mixture, when dried contains approximately 55.6% cryolite and 44.4% aluminum fluoride. Also for further example; to 246 parts, by weight, of sodium aluminate in a suitable vessel, I add 120 parts, by weight, of sodium hydroxide, then 300 parts, by weight, of hydrofluoric acid; and I obtain 420 parts, by weight, of cryolite and 84 parts, by weight, of aluminum fluoride (plus 162 parts, of water which I remove). This resultant product after drying is then a mixture of approximately 83% cryolite and 17% aluminum fluoride.

Furthermore, from the above referred to equations I can by the above stated manipulations of my process, add additional sodium hydroxide to the sodium aluminate, in any quantity I desire to combine in the formation of more cryolite and less aluminum fluoride, up to the point where no more free aluminum fluoride is left, and then I have only cryolite and water, with no free aluminum fluoride.

This invention can be carried out in many ways and with many substances and the specific features of the process as described are to be considered as merely exemplary and not as limiting the scope of the invention as claimed.

What I claim is:

In the process of simultaneously manufacturing artificial cryolite and sodium fluoride the steps comprising adding to an aqueous solution of sodium aluminate a quantity of sodium hydroxide in excess greater than the correct excess necessary to completely react in the succeeding step with hydro-fluoric acid to produce cryolite and water, and treating the mixture with the correct proportion of hydro-fluoric acid to co-produce cryolite, sodium fluoride and water, and separating the cryolite and sodium fluoride thus formed.

GANT GAITHER.